US005163662A

United States Patent [19]

Bernstein

[11] Patent Number: 5,163,662

[45] Date of Patent: Nov. 17, 1992

[54] MULTI-PURPOSE MACHINE VISE

[75] Inventor: Leon M. Bernstein, Minneapolis, Minn.

[73] Assignee: Kurt Manufacturing Company, Inc., Minneapolis, Minn.

[21] Appl. No.: 528,944

[22] Filed: May 24, 1990

Related U.S. Application Data

[62] Division of Ser. No. 205,465, Jun. 10, 1988, Pat. No. 4,928,937.

[51] Int. Cl.[5] .............. B23Q 3/02

[52] U.S. Cl. .............. 269/136; 269/138; 269/244; 269/256

[58] Field of Search .............. 269/101, 134, 136, 138, 269/244, 256, 329

[56] References Cited

U.S. PATENT DOCUMENTS

| | | | |
|---|---|---|---|
| 2,564,138 | 8/1951 | Walker | 269/138 |
| 2,570,857 | 10/1951 | Purpura | 269/138 |
| 3,514,092 | 5/1970 | Lassy | 269/134 |
| 4,043,547 | 8/1977 | Glomb et al. | 269/136 |
| 4,223,879 | 9/1980 | Wolfe et al. | 269/32 |
| 4,413,818 | 11/1983 | Lenz | 269/81 |
| 4,688,779 | 8/1987 | Dornfeld | 269/244 |

*Primary Examiner*—J. J. Swann
*Attorney, Agent, or Firm*—Kinney & Lange

[57] ABSTRACT

A machine vise that can serve multipurpose uses is constructed utilizing a cast base made so that it can be easily mounted for NC machining, or mounted on a swivel base, and can be used mounted on its sides or on one end. The cast base is made to simplify clamping to a tool table by providing an accessible ledge for clamping along the sides and ends. The ledge also provides a coolant drain trough. A support for the distal end of the vise screw is mounted to simplify manufacturing without losing precision operation. The same vise body can be adapted for use with interchangeable screws for manual operation of a movable jaw from either end of the vise or using a hydraulic actuator for clamping the movable jaw.

7 Claims, 9 Drawing Sheets

MULTI-PURPOSE MACHINE VISE

This is a divisional application of application Ser. No. 07/205,465, filed Jun. 10, 1988, now U.S. Pat. No. 4,928,937.

BACKGROUND OF THE INVENTION

1. Field of the Invention

The present invention relates to a machine vise which can be universally adapted for a wide variety of applications.

2. Description of the Prior Art

U.S. Pat. No. 4,413,818 shows a combination vise that can be used as a machine vise and which has various pockets and openings for external clamping. The vise shown in U.S. Pat. No. 4,413,818 can be used with any one of its sides supported on a tooling table, and includes a movable jaw assembly and a stationary jaw. However, it does not have a cast base and frame adapted for use in the manner of the present device.

Kurt Manufacturing Company, Inc. of Minneapolis, Minn. makes a line of precision machine vises under the trademark AngLock including pull type screw operated vises and hydraulic vises.

Additionally, a vise which illustrates use of slots in the base for attaching the vise to a tool table is shown in U.S. Pat. No. 4,688,779. A typical machine tool vise is also shown in U.S. Pat. No. 4,223,879, also owned by Kurt Manufacturing Company, Inc. of Minneapolis, Minn. Patent '879 illustrates a typical type of movable jaw used in the present device, and illustrates a conventional mounting of the vise screw. It also shows an adaption for fluid pressure operation.

SUMMARY OF THE INVENTION

The present invention relates to a machine vise that has a cast base, and which is made to be very rigid and yet lightweight. The side surfaces are formed so the vise can be used while supported on its sides, or on an end surface at the end where the fixed jaw is mounted. The vise base is made with a clamping ledge around a major portion of its periphery for adaptability. A plurality of vises also can be mounted side by side on center distances that are standard for NC machining.

A coolant trough is formed on the vise body in the clamping flange and provides a drain trough for directing the coolant that is used with the machine tool to a desired location for drainage so that it does not run off the vise base and onto the floor. Likewise, the coolant is not trapped on the interior of the vise base, where coolant will sometimes collect and then spill on the operator.

The crank end of the screw, which is normally remote from the fixed jaw, is mounted in a special rear support bracket that permits the rear or remote portion of the vise base to be left open so that coolant can drain out through the rear and through the drain trough to the desired location. The rear support for the screw provides for easy mounting, low cost manufacture, and accuracy.

The vise jaws have jaw plates that are removable can be inverted, and used with either one of their respective longitudinal ends extending outwardly with the other edge riding on the movable jaw ways or guide surfaces. The vise is adapted to be easily mounted on a swivel base as well, and includes openings or slots in the base plate of the vise base to permit bolting the vise to tool mounting slots in tool tables with interior bolts, for securing it without external clamps. The interior bolts save space and insure that the vise can be mounted on close center distances for NC machining.

Additional important features include the use of a biasing load against the leading edge of the movable jaw so that the leading edge of the jaw will bear against the guide surfaces or ways and scrape the surfaces to prevent chips from getting under the movable jaw. Thread cleaners are mounted on the jaw nut that is operated by the vise screw to engage the screw threads to insure that the vise screw is cleaned to prevent jamming of chips in the nut and screw threads.

The vise is quickly converted to a vise type with the crank end of the screw at the fixed jaw end of the vise base, and it can also be converted to a hydraulically locked vise very quickly, utilizing the same cast vise base.

DETAILED DESCRIPTION OF THE PREFERRED EMBODIMENTS

Figure 1:
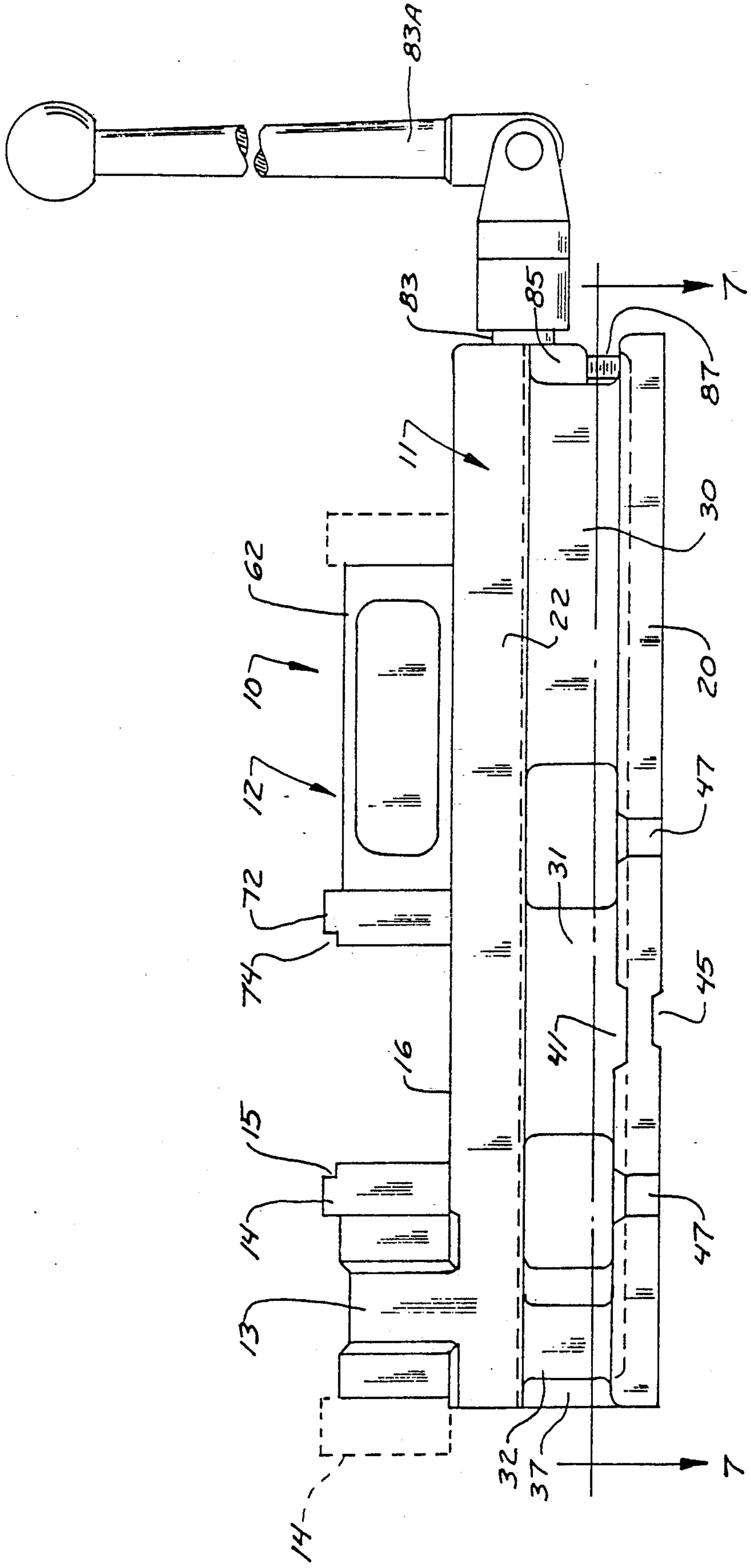
FIG. 1 is a side elevational view of a vise made according to the present invention.

A machine vise indicated generally at 10 in FIG. 1 includes a cast base assembly 11 which mounts a number of components that include a movable jaw assembly 12, and a fixed jaw block 13, that is positioned at the front end of the case base assembly 11. The fixed jaw block 13 has a fixed jaw plate 14 mounted to the fixed jaw block on a surface that is machined for accuracy. The jaw plate 14 faces the movable jaw and as can be seen has a notch 15 along one longitudinal edge. The opposite longitudinal edge of jaw plate 14 is a square edge that is seated, as shown, against a pair of spaced apart, upwardly facing machined guide surfaces or ways 16.

The fixed jaw plate 14 is mounted with cap screws 17 that are on center lines indicated at 18 positioned midway between the opposite longitudinal edge surfaces of the jaw plate, so that the jaw plate 14 can be inverted and the notch 15 can be positioned adjacent the ways 16 if desired. In other words, the center lines 18 are at the proper location so that the jaw plate 14 can be flipped and reversed edge for edge relative to the guide surfaces or ways 16.

Figure 5:
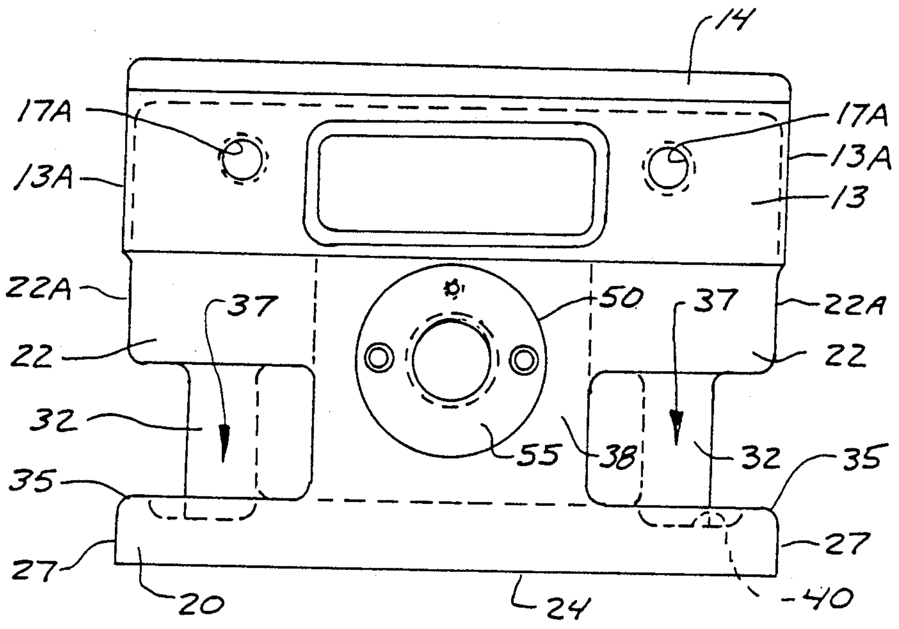
FIG. 5 is a front end elevational view of the vise of FIG. 1.

The bores 17A for the two cap screws 17 that are used for holding the jaw plate 14 in position can be seen in FIG. 5.

Figure 2:
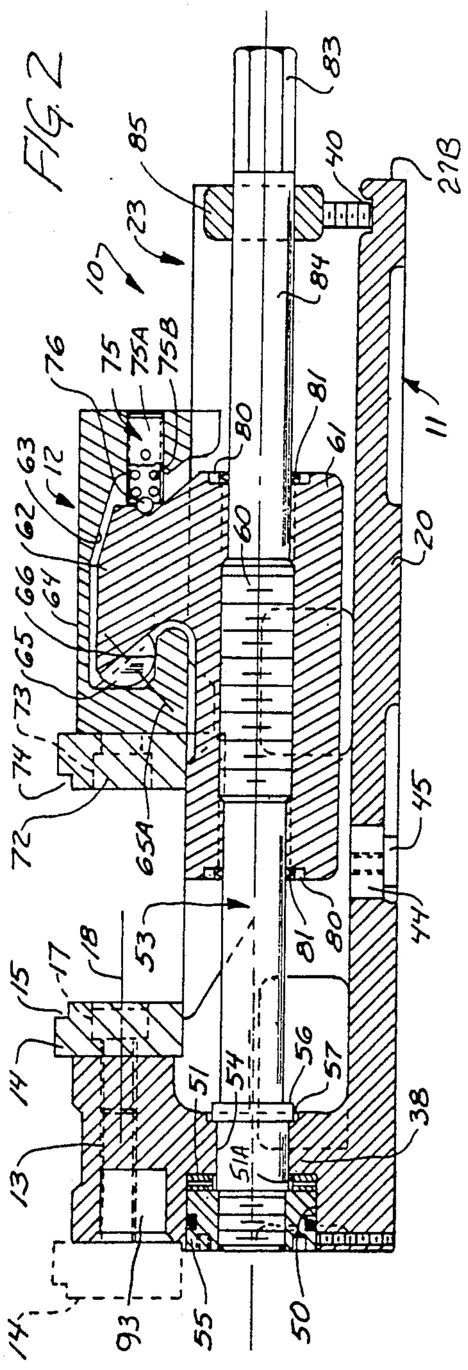
FIG. 2 is a vertical sectional view through the center of the vise shown in FIG. 1.

The cast base assembly 11 is made in a unique fashion, and is provided with a cast base plate 20. The cast base assembly 11 in addition to supporting the fixed jaw block 13, supports a pair of spaced apart longitudinally extending ways or support rails indicated at 22,22, and which can be seen in end view in FIG. 3. These rails have the upper guide surfaces 16 thereon, which are guide surfaces for supporting the movable jaw assembly 12. The rails 22 form overhanging shoulders and extend for the full length of the cast base, from the fixed jaw block 13 back to a rear remote or distal end indicated generally at 23 in FIG. 2. The upper surfaces or ways 16 of the rails 22 are parallel to a lower or base surface 24 of the base, and are machined surfaces. In addition, the rails have inwardly facing guide surfaces 25,25, which face each other and which are spaced apart with respect to the center plane of the vise indicated at 26 in FIG. 3, which is perpendicular to surface 24. The outer or side surfaces 22A of the rails 22 are spaced inwardly just slightly from the outer longitudinal side edge surfaces 27,27 of the base plate 20. The block 13 is machined to have side surfaces 13A,13A (FIG. 5) that are the same plane as the surfaces 27A,27A, respectively. The fixed jaw plate 14 also is made to have the same width from side to side, and has side planes 14A coincident with planes 13A, while the movable jaw is narrower than the surfaces 27,27. The surfaces 13A, 14A and 27 will permit the vise to be rested on its sides for use on a tool table and be very stably supported. The midportions of vise support block 13 are recessed slightly as can be seen in FIGS. 1 and 2. The movable jaw 12 can be moved with the vise resting on surfaces 27 and 13A.

The rails or shoulders 22 are supported at spaced locations relative to the base plate 20 on cast web members 30 and 31 adjacent opposite sides of the base plate and the rails 22 join the fixed jaw block 13 as well. The fixed jaw block 13 is supported on a cross web 32, that extends across the fixed jaw end of the vise. The web 32 is inset from the surfaces 27 slightly and also is inset at the front surface for a short distance in from the sides.

As can be seen, the webs 30 and 31 are on opposite sides of the base plate 20, and are spaced inwardly from the plane formed by the surfaces 27 and also are spaced inwardly from the outer side edge surfaces 22A of the rails 22. The spacing between the surfaces 27 and the outer sides of webs 30 and 31 provides a ledge or rim 35 along the sides of the vise base assembly. Also it can be seen that the ends of webs 30 are spaced inwardly from the surface 27B at the remote or distal end of the base 20 (see FIG. 7) to provide a ledge portion 36. At the front end of the vise, there are ledges 37 that extend inwardly from each of the planes formed by the side surface 27 of the base plate 20 (see FIG. 5) and which extend to a center portion 38 of the web 32. These ledges 35, 36 and 37 provide a rim within the side surfaces of the base plate and fixed jaw for permitting clamping of the machine vise from the sides or the ends. This increases the versatility of the vise while maintaining the ability to support the vice base on its side on a tool table.

Figure 7:
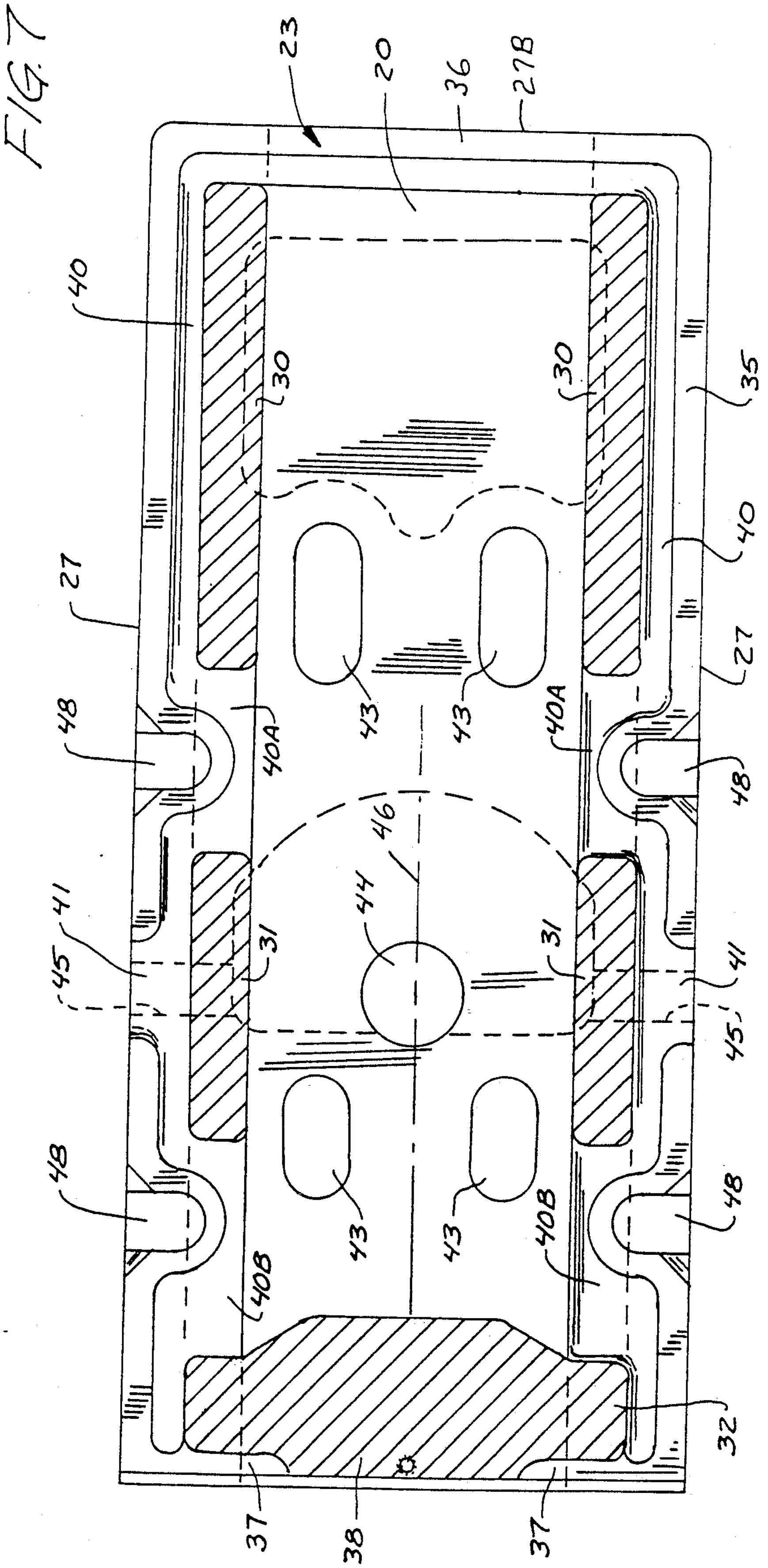
FIG. 7 is a sectional view taken as on line 7—7 in FIG. 1.

Additionally, as can perhaps be seen in FIG. 7 as well, a coolant trough or groove indicated at 40 is formed adjacent the periphery of the base plate 20, to provide for a flow path for coolant. The trough 40 is a recess which is positioned to the outside of the webs 30 and 31. The groove has sections 40A extending into the spaces between webs 30 and 31 on the opposite sides of the base plate 20. Trough sections 40B are formed in the spaces between the two webs 31 and the ends of web 32 that supports the fixed jaw block 13. FIG. 7 also shows the ledge sections 37 and the center portion 38 of the web 32 in cross section.

The coolant trough 40 has outlet openings or drains 41 on opposite sides of the vise base plate 20 in a central portion of the vise base, to permit coolant to flow out from the vise base and from the trough 40 in a desired location, rather than at the ends. It should also be noted that the webs 30,30 are spaced apart laterally to leave an open center and there is no cast-in web supporting the rails 22 at the remote end or end of the base opposite from the fixed jaw.

Figure 6:
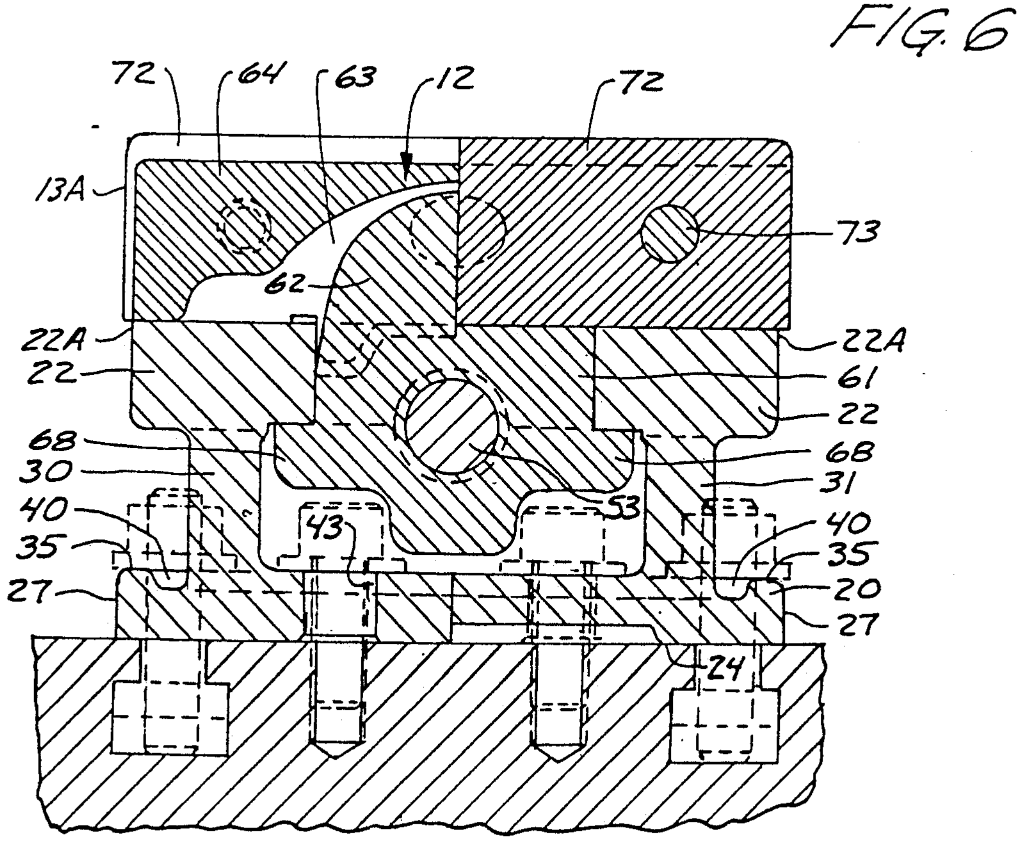
FIG. 6 is a sectional view taken as on line 6—6 in FIG. 4.

In FIG. 7, it can be seen that the base plate 20 has four longitudinally extending mounting slots 43 formed therein, that permit the base plate 20 to be clamped to a tool table. The mounting slots 43 are spaced apart laterally for use in clamping the base 20 to a tool table. In FIG. 6, a tool table 49 is illustrated with cap screws in the slots 43 shown in dotted lines. Further, a central mounting hole or bore 44 is provided, and it is centered transversely on the base plate 20 and is positioned at a desired fore and aft location for locating the vise base plate relative to a swivel base.

The slot 43 are used for clamps when the vise is placed on its side. The clamp bar ends will fit into the slots, which are spaced up from a tool table top when the vise is placed on its side, and clamp screws force the vise against the table top in a conventional manner.

Shown in dotted lines in FIG. 7 are slots 45,45 on opposite side edges of the base plate 20, which are centered on a center line of the bore or opening 44 that passes through the axis of this bore and which is perpendicular to the longitudinal axis 46 of the vise. The slots 45,45 are used to mount an indicator when the vise is positioning a swivel base. There are four slots 48 formed into the side portions of the base plate 20 for bolting the base plate to the tool table with screws as also shown in FIG. 6. The slots 48 are open ended pocket type slots. The coolant trough passes around these slots and a rib around the inner ends and sides of the slots defines the outer side of the coolant trough in sections 40A and 40B.

The vise is a pull type vise, that is, the forces for closing the jaws are reacted into the web 32 and the block 13 for mounting the fixed jaw plate 14 and the vise screw is under tension. The force reaction is provided by using a receptacle or bore 50 in the front surface of the center portion 38 of the web 32, and this bore 50 has a thrust bearing 51 at its inner end, that rests against a shoulder 51A to carry loads on its outer side into the web 32, which is formed integrally with the base plate 20. A vise shaft or screw assembly 53 is mounted through a suitable bore 54 in the web 32, and has a fixed cap or nut 55 thereon positioned within the bore 50, and threaded to an end portion of the shaft screw assembly 53 to carry the reaction force from the screw assembly that acts in a direction tending to tighten the movable jaw assembly against the fixed jaw. The screw assembly 53 is placed under tension, which places a load against the thrust bearing 51 and shoulder 51A and thus the load is carried into the web 32.

An annular shoulder 56 is formed on the vise screw assembly 53, and it reacts against a counterbore surface 57 that is formed on the interior side of the web 32 to react forces that are applied when the movable jaw 12 is moved in a direction tending to separate it from the fixed jaw.

Figure 3:
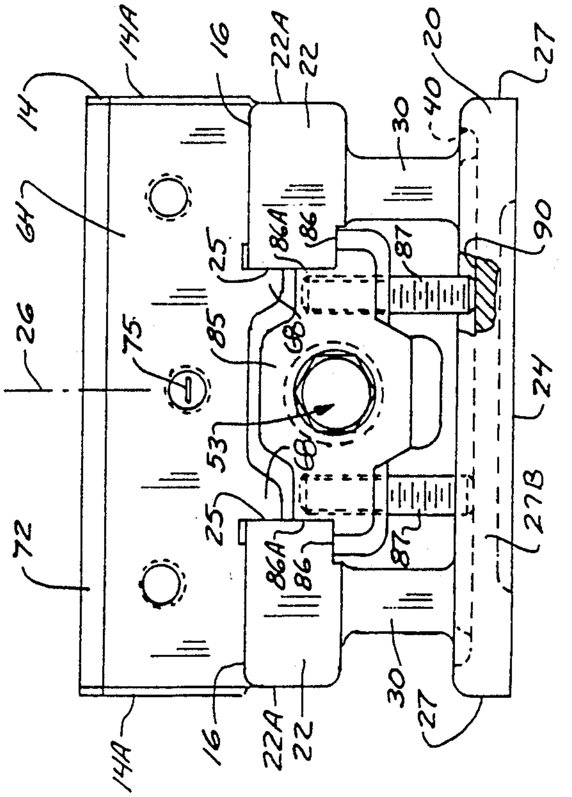
FIG. 3 is a rear end elevational view of the vise of FIG. 1 with parts in section and parts broken away.
Figure 4:
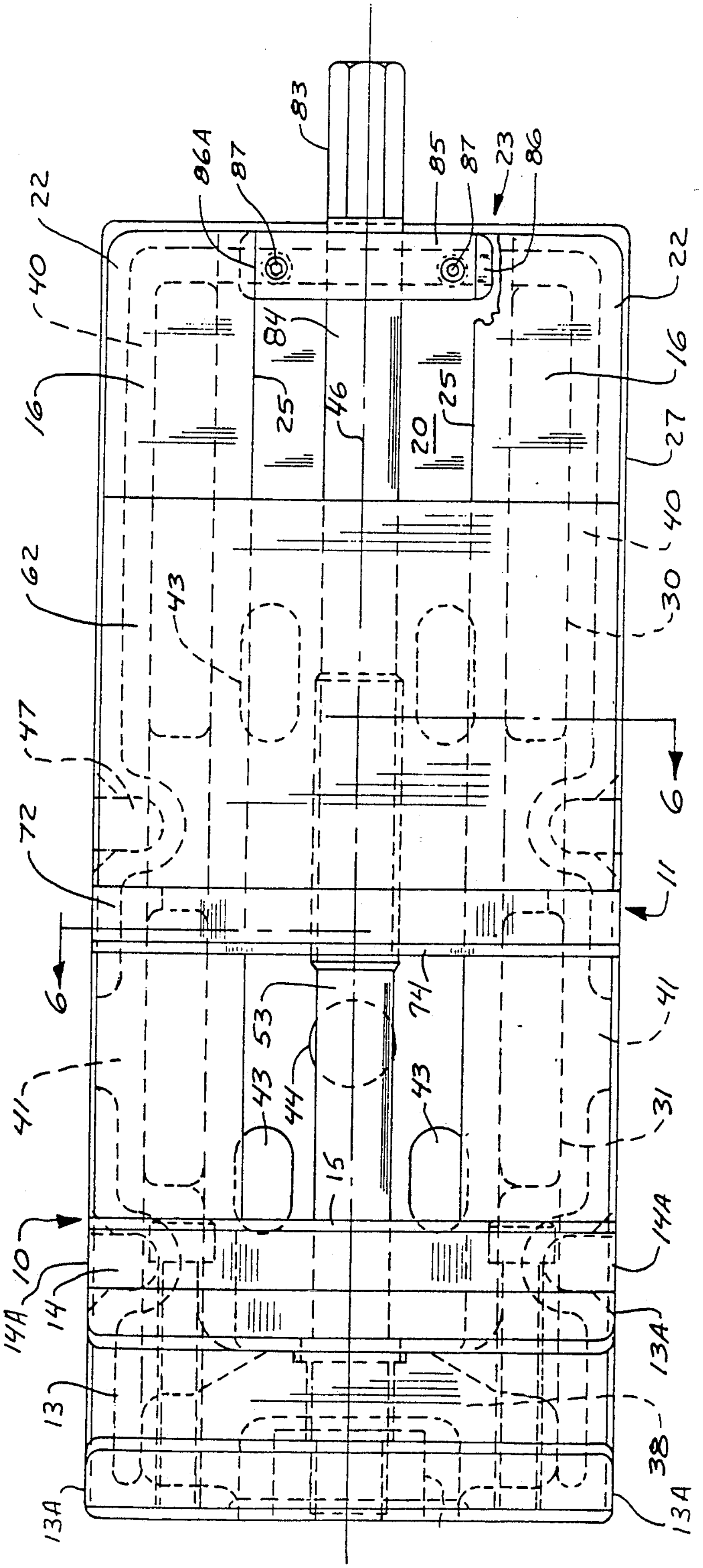
FIG. 4 is a top plan view of the vise of FIG. 1.

The vise screw assembly 53 has a threaded portion 60 in the midportions thereof that threads into a vise jaw nut 61. The jaw nut 61 has a head portion 62 of conventional design that fits into a receptacle 63 on a movable jaw body 64. The head portion 62 carries a part-spherical load button 65 that is positioned to provide a force line 65A at an angle with respect to the plane of the guide surfaces 16. The load button fits into a receptacle 66 that is formed so that the button 65 will engage the surfaces of the recess 66 along an annular line around its periphery. The jaw body 64 for the movable jaw, as shown in FIG. 3, has guide lugs 68 thereon which fit down in the space between the surfaces 25,25 of the rails 22, and provide guide surfaces for the movable jaw in transverse directions. The movable jaw body also has downwardly facing surfaces which mate with the upwardly facing guide surfaces or ways 16, to provide a smooth guiding of the jaw body on these surfaces. The movable jaw body is elongated in the longitudinal length of the screw, to provide adequate guiding and support.

A movable jaw plate 72 is bolted onto the forward edge of the body 64, and bolts or cap screws 73 for mounting the movable jaw plate are also on a center line that is spaced from the surfaces 16 midway between the longitudinal edges of the jaw plate 72 so the jaw plate 72 can be flipped edge for edge to permit an edge portion 74 to engage the way surfaces 16 as well as the flat edge surface that is shown in FIG. 2.

The movable jaw body 64 is provided with a spring loaded detent 75 mounted in a bore at the rear side of the body, and this detent has a spring loaded ball 76 which is made to engage a cam surface 77 in the body 64 specifically formed at a desired angle with respect to the surfaces 16 when the jaw body is mounted on the jaw nut, to provide a downward load component on the forward edge corner indicated at 72A of the jaw plate 72 so that there is a resilient loading of the edge of the jaw plate 72 on the surfaces 16 that tends to scrape or clean off chips coming from a part held between the jaw plates 14 and 72. This spring loaded detent 75 includes an outer housing 75A, and an internal spring 75B which provides a spring load on the ball 76 to react on surface 77 and give the scraping action.

Additionally, the jaw 61 has annular brush carrying collars 80 at its front and rear edges, and these brush collars have bristles 81 that engage the surface of the thread section 60 of screw assembly 53 as the threads enter the bore of the nut, to remove chips that might be sticking to the screw assembly 53.

The rear portions of the screw assembly 53 are formed with a drive end 83. A shaft portion 84 extends between the screw thread section 60 and the drive end 83 of the vise screw assembly 53. The shaft portion 84 is supported in a bearing support housing 85 that is mounted in a unique manner so that the remote end of the vise body can be kept open to permit coolant to flow freely into the trough 40 at the rear of the vise, and also to reduce weight and cost. The housing 85, as shown in FIG. 3, has formed shoulder portions 86,86 on opposite sides thereof that have upwardly facing surfaces, machined precisely in position, and also has side guide surfaces 86A on opposite sides thereof which fit between the surfaces 25,25 very closely. Surfaces 25,25 of the guide rails 22 are machined, as are the surfaces 86 and 86A, so that a very close and accurate fit can be obtained. The housing 85 has a central bore for rotatably receiving the shaft portion 84 of the vise screw assembly 53 (the shaft rotates only at very slow speeds of cranking) and the housing 85 is clamped in place with the shoulders 86,86 up against the undersurface of the rails 22 through the use of a pair of adjustable screws 87,87 which are threaded through side portions of the housing 85 and which have ends that fit into the coolant trough 40 at the rear portion 23 of the vise base. The screws 87 are adjusted to bear against the inner surface of the coolant trough 40, as shown generally at 90 in FIG. 3. The housing 85 is then securely clamped in position by applying sufficient torque on the screws 87. The surfaces 86 and 86A of housing 85 locate it properly for rotatably mounting the remote end of the screw assembly 53. The construction permits lower cost manufacturing of the support for the vise screw assembly, reduces machining on the large cast base and leaves the rear portion of the vise base open so the coolant can flow from the rear portion into the trough 40 and then out through the drain 41. The space between the screws 87 in the trough 40 can be drained if the screws are smaller than the trough.

Thus in use, with a part or workpiece positioned between the jaw plates 72 and 14, the screw assembly 53 can be turned with a drive crank 83A on the screw end 83, so that the movable jaw will be moved toward the fixed jaw. As the jaw plates tighten on the workpiece, the force will be reacted by the nut 55 which rotates in the bore 50, through the thrust washer 51 to the base wall of bore 50 into the web 32. The vise screw assembly 53 will be under tension between the end of the vise screw assembly held by the nut 55 and the screw thread section 60. The vise is thus a pull type vise which tends to reduce deflection of the base under clamping loads.

The jaw plate 72 will be held snugly against the surfaces 16 of the guide ways through the use of the spring loaded detent plunger 75, and thus chips are scraped off the surfaces 16 and do not slide under the movable jaw. Coolant can flow out of the trough 40 in the base plate. The clamping ledges 35, 36 and 37 are formed at all sides, even at portions of the front end, by recessing the webs inwardly from the rails 22 and the upper portions of the fixed jaw support block 13. The webs 30 and 31 mounting the rails 22 are also spaced inwardly for forming a coolant trough and having drains for coolant discharge. Weight is kept at a minimum, but strength is still maintained because of the pull or tension action on the vise screw from the fixed jaw end.

When casting the vise body a recess indicated generally at 93 in FIG. 5 is cast into the vise block 13 (see FIG. 2 as well). The recess serves as a handhold for ease of handling of the vise and also serves as a clamp surface or location when the vise is placed on its side, or, if desired, a clamp can be placed in the recess when the vise is supported on its base.

The fixed jaw plate 14 also can be mounted on the front end of the jaw support block 13 as shown in dotted lines in FIG. 2, and the jaw plate 72 can be mounted on the rear of movable jaw housing 64 as shown in dotted lines in FIG. 1.

Figure 8:
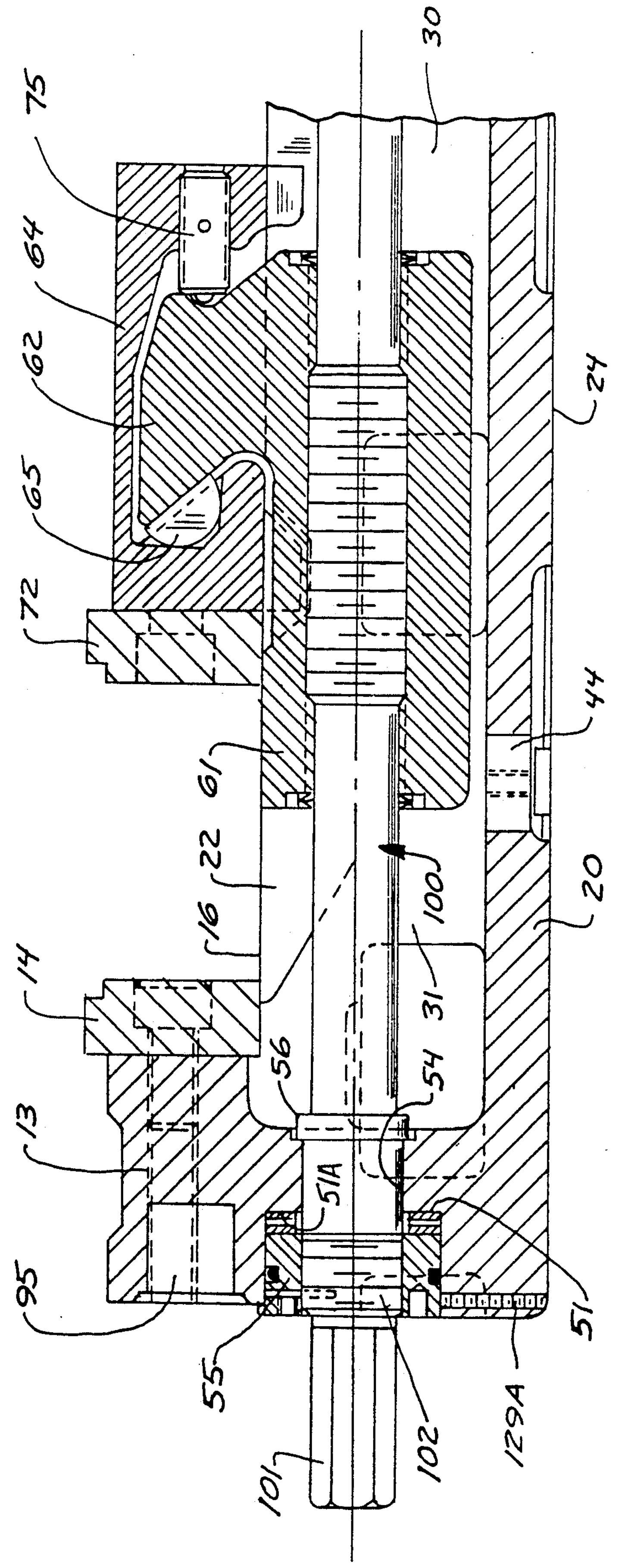
FIG. 8 is a sectional view of a modified form of the invention utilizing a screw having the crank end at the fixed jaw end of the vise of FIG. 1.

A modified form of the invention is shown in FIG. 8 wherein the crank end of the vise screw assembly is placed at the fixed jaw end of the vise. In this form of the invention, the vise screw assembly 100 as shown is modified so that the crank attachment drive end 101 is at the fixed jaw or front end, and the nut 55 is threaded over a threaded portion 102 of the vise screw assembly 100. The screw can have a drive at either end or at both ends for effecting a manual drive. The outer end of the vise screw, at the remote end of the vise base is unsupported and housing 85 is not needed. The screw assembly 10 provides a field retrofit or kit that can be installed without any changes in the vise base structure to permit having the vise handle or crank at the front or fixed jaw end of the vise. The other construction of the vise is exactly the same as that shown in the previous forms of the invention.

Figure 9:
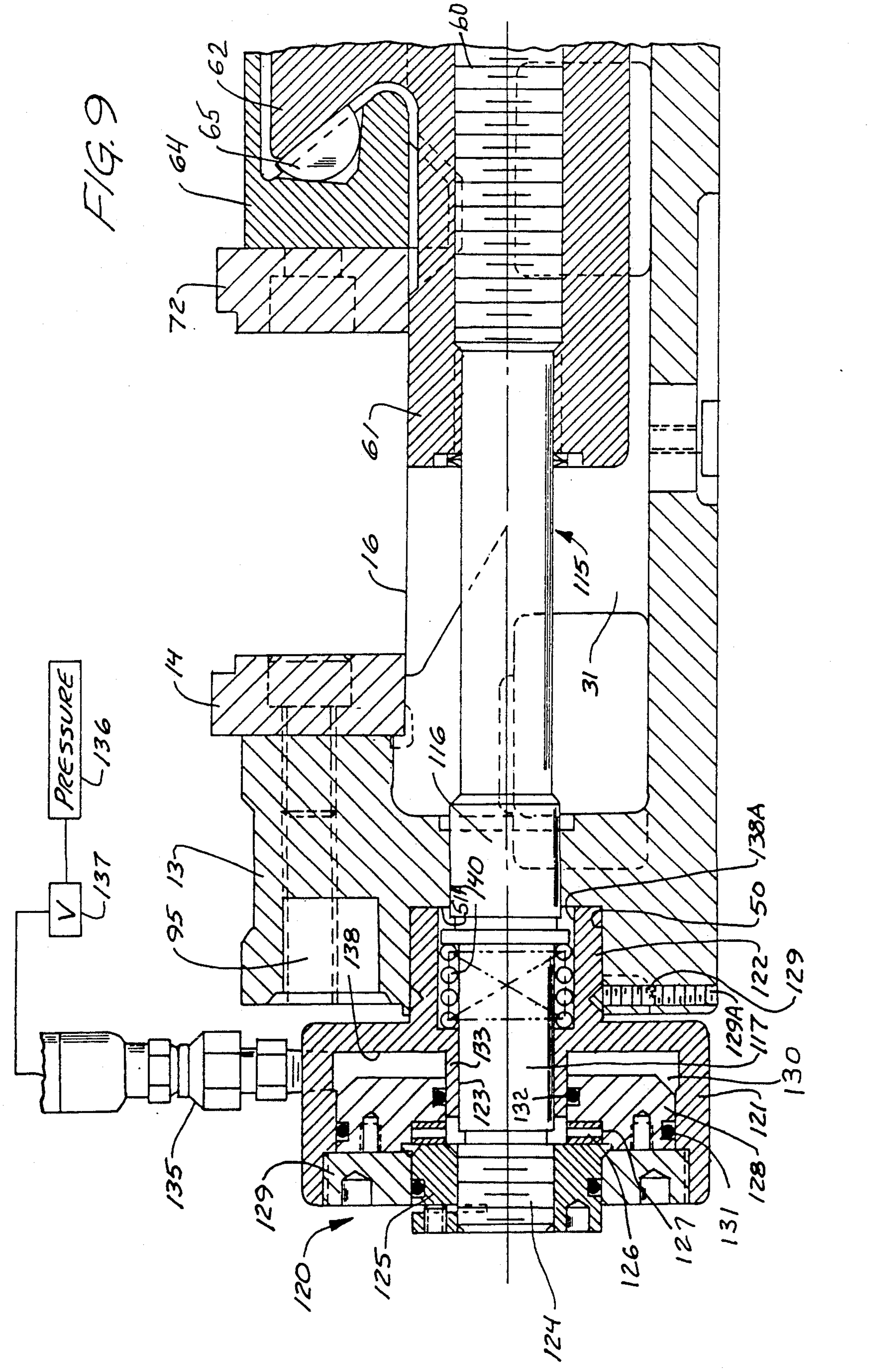
FIG. 9 is a fragmentary sectional view of the vise of FIG. 1 adapted for use as a hydraulically operated vise utilizing the same vise base and jaw.

In FIG. 9, a conversion for a hydraulic actuator to be used with the same vise base, utilizing the same bore 50 at the fixed jaw end of the vise base is illustrated. In this instance, the remote end of the vise screw is supported on a housing 85 at the rear portions in the same manner as before (which is not shown), but the vise screw assembly 115 is modified at the fixed jaw end to include a support section 116 that rotatably mounts in the bore 54 in the center portion of the web 32. A hydraulic actuator attachment end 117 is formed on the vise screw assembly 115. In this form of the invention, a hydraulic actuator indicated generally at 120 comprises an outer actuator housing 121 that has a neck 122 that fits into the bore 50. The neck 122 has a V-shaped groove 122A defined in its outer surface. The neck is retained in the bore 50 with a set screw 129 threaded into an existing opening 129A in the vise base. The opening 129A is made in all the vise bases and when a hydraulic actuator field kit is installed, the screw 129 is threaded in place to hold actuator housing 121 securely.

The screw 129 has a cone point that bears on the inner side of the V-shaped groove 122A to force the neck to be seated against the inner end shoulder 51A of the bore 50.

The actuator housing 121 has a central bore 123 that permits the vise screw section 117 to pass therethrough. The outer end of the vise screw section 117 has threads indicated at 124 that mount a nut 125 to carry axial load. This nut 125 rests against a thrust bearing 126 that is positioned in a receptacle 127 in a piston assembly 128 that is mounted inside a hydraulic chamber or bore 130. The nut 125 is axially slidable in a bore formed in an end cap 129B that threads into the end of actuator housing 121 to close chamber 130. The end cap is fixed in position in the housing with suitable threads.

The hydraulic chamber 130 is on the interior of the housing 121, and the piston is suitably sealed with a seal 131 with respect to the outer surface of the chamber. The piston 128 also has a seal 132 that fits around an interior neck 133 in which the bore 123 is formed. A hydraulic line 135 leading from a pressure source 136 through a valve 137 is connected to the interior of the chamber 130, and while the piston is shown in its clamped position, the piston 128 can move back toward the interior end wall 138 of the chamber 130 and is urged against the wall 138 with spring 140 which is positioned between a shoulder 141 on the vise screw and a shoulder in a bore 138A in neck 122. Then a part or workpiece to be clamped can be manually clamped between the jaw plates by operating the vise screw assembly 115 in the same manner as shown in connection with FIG. 1 by turning the crank at the remote or distal end. This will tend to clamp the jaws, and snugly hold the part between the jaw plates. After the part is held by manual tightening of the vise jaws, the piston is against wall 138. Fluid under pressure then is admitted into chamber 130 through valve 137, causing the piston 128 to move toward its position shown in solid lines in FIG. 9 to clamp the part securely.

The vise screw can be driven to tighten down on the part before hydraulic pressure is applied. The vise can be manually actuated as well with the hydraulic actuator mounted, merely by tightening the vise screw as desired.

The cast vise body thus can be adapted for field retrofit to conform to the configurations shown in FIGS. 8 and 9 very simply, using screw 129 to hold the hydraulic actuator in place in the existing bore used for reacting the loads from the manually operated vise screw.

Figure 10:
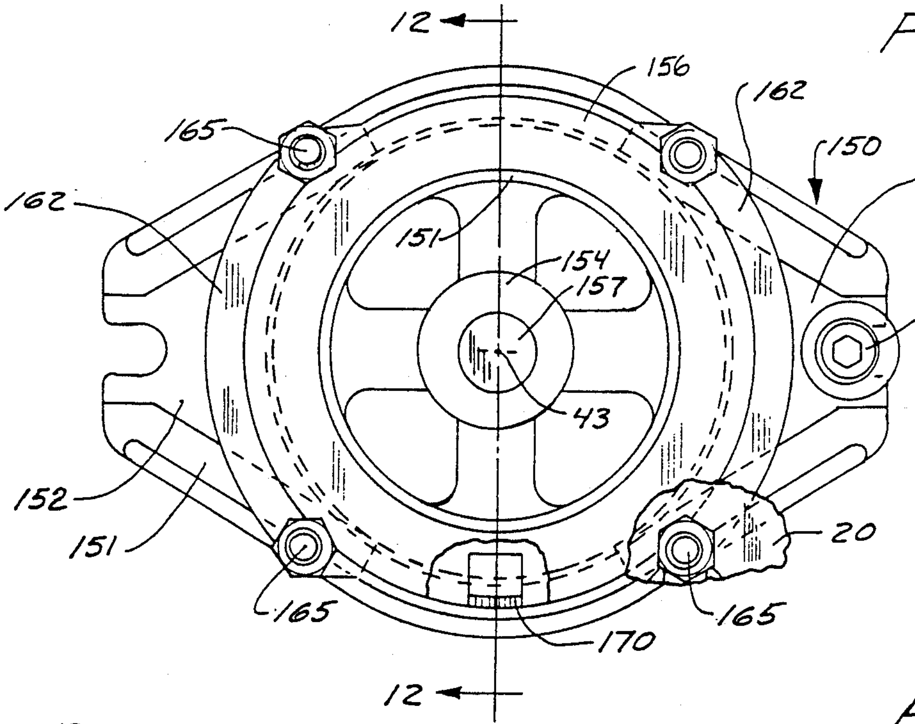
FIG. 10 is a top plan view of a swivel base for a vise made according to the present invention.
Figure 11:
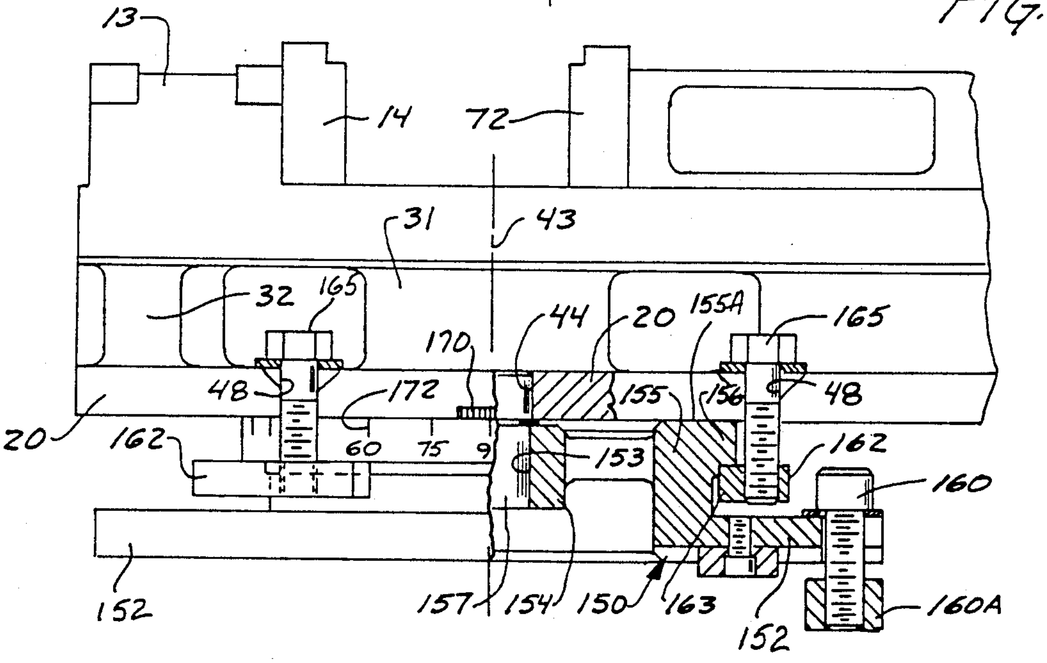
FIG. 11 is a side view of the swivel base of FIG. 10 with parts in section and parts broken away.
Figure 12:
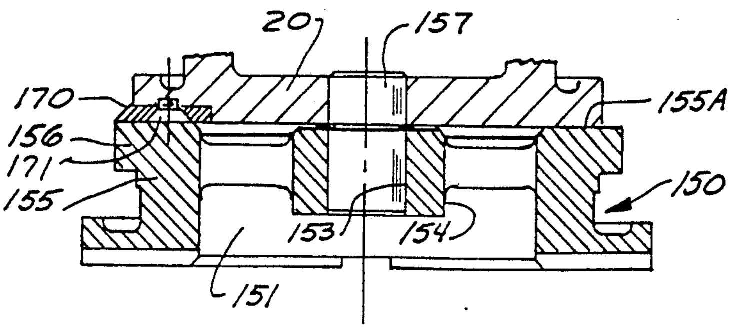
FIG. 12 is a sectional view taken as on line 12—12.

Additionally, the unit can be made to be mounted onto a swivel base, using the opening or bore 44, and the slots 45 for mounting the swivel base as shown in FIGS. 10, 11 and 12.

The use of a swivel base assembly for the vise of the presently invention is illustrated in FIGS. 10, 11 and 12. In this form of the invention the swivel base assembly 150 includes a base mounting member 151 which has a pair of ears 152,152 that extend laterally from a central axis of a bore 153. The bore 153 is defined in a neck 154 that is supported on a swivel column 155 that has an overhanging peripheral ledge or lip 156 extending all the way around the column. This a cylindrical shoulder or lip 156. The column 155 has an upper surface 155A on which the vise base plate 20 will rest, and a pivot shaft 157 is mounted in the bore 153 in collar 154, so that the shaft 157 is centered relative to the column and the peripheral ledge or lip. The pivot shaft 157 has an upwardly extending end that fits within the bore 44 of the base plate 20 and is thus centered on the axis 43 of that bore. The base plate 20 and vise assembly 10 are rotatably mounted on the shaft 157, and slide on the surface 155A, so that the vise is guided for rotation about the axis of the shaft 157 for swiveling.

The ears 152 have slots at the outer ends for receiving clamp screws 160 that can be provided with nuts 160A that fit down into tooling table slots to hold the ears securely on a tool table.

The position of the vise base 20 about the axis 43 is fixed by utilizing a pair of part annular clamp rings 162 that have lip portions 163 that fit underneath the shoulder 156 as shown in FIG. 11, and these clamp rings are held in place with suitable cap screws 165 that are fitted into the slots 48 on the vise base plate 20. In FIG. 10 a portion of the vise base plate 20 is shown fragmentarily to show cap screw 165 in one slot 48. Another portion of the vise is shown fragmentarily adjacent to one slot 45 in the vise base, which, as shown in FIGS. 10 and 12, houses an indicator tab 170 that is held in place within the slot 45 with a suitable counter sunk screw 171 that threads into an opening in the vise base plate 20.

Upon loosening the cap screws 165, the clamp plates 162 are still retained in position underneath the shoulders 156, but the entire vise base plate 20 and vise can be rotated about the shaft 157 on axis 43 by sliding it on the surface 155A until the vise is in its desired position. It can be seen that the outer surface of column 155 has angle indications 172, and then the indicator tab 170 cooperates with these angle indications so that a precise angular location of the vise can be obtained. Then the clamp or cap screws 165 are tightened to clamp the base 20 tightly against the surface 155A and hold the vise in its desired rotational position. The swivel base can be oriented in a reference position on a tool table with a locator bar 174 which is attached to the swivel base 151 and which fits closely into a slot in a tool table and which then extends parallel to the slot for a reference position.

While the swivel base is relatively standard, as shown, the adaption to use of the vise with the present invention greatly enhances the accurate and prompt use of this vise.

Additional protractors of course can be used with the vise as well in a conventional manner by having a protractor that rests against the side surface of the vise plate 20 and provide indications of angle relative to the tool table with which the vise base is used.

Figure 13:
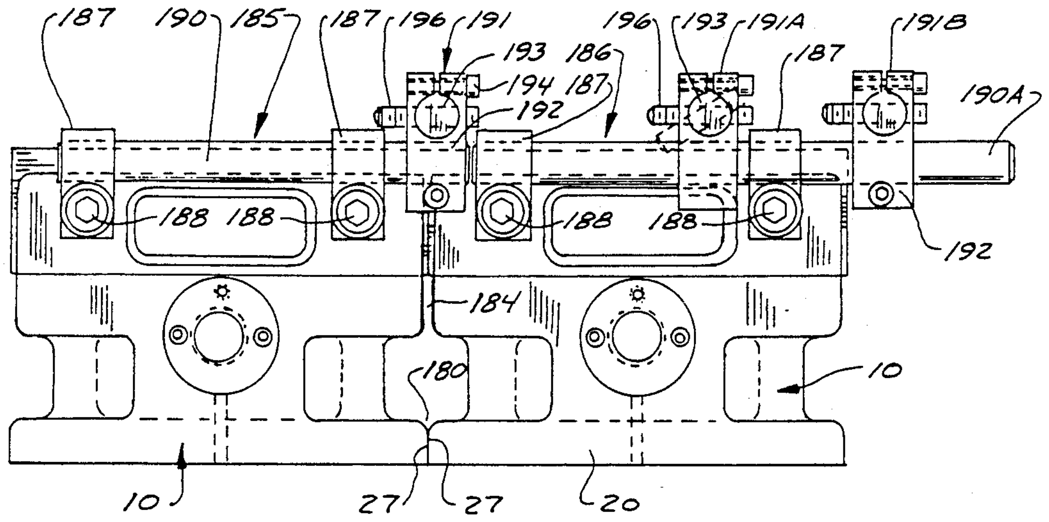
FIG. 13 is an end elevational view of two of the vises made according to the present invention placed in side by side position and having a positive stop installed thereon that will operate with two vises placed as shown.

As shown in FIG. 13, two of the vises 10 are positioned with edge surfaces 27 of the base plate 20 abutting as shown at 180, so that the two vises 10 are side by side for work and for holding a plurality of parts. The vices, of course, would be suitably clamped onto a tool table for operation. It can be seen that the fixed jaw blocks 13 are formed as previous explained so that there is a space indicated at 184 between the jaw blocks 13. The jaw plates exactly align with the surfaces 27 of the base plates 20 so that the vise surfaces 27,27 and the edges of the jaw plates will abut securely.

The multipurpose function of the present device is illustrated by the fact that the vise stop is made to mount into the holes used for the cap screws 17. As shown in FIG. 13, there are two of the positive stop assemblies 185 and 186 positioned on the two vises, and one is positioned on each vise. These vise stop assemblies are identical except that one of them has a stop rod positioned in a different location on the vise jaw and also has a second stop rod positioned along the outer edge of the jaw.

Figure 14:
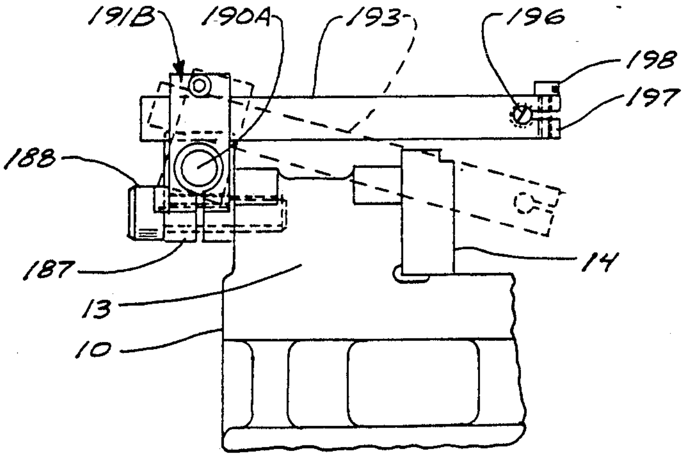
FIG. 14 is a side elevational view of the fornt portion of the vise showing the positive stop of FIG. 13.

The first vise stop assembly 185 has two support clamp members 187,187, each of which is held in place with a cap screw 188, that threads into one of the openings for the cap screws 17 but threaded in from the outer end of the vise, so that the threaded holes for the cap screws 17 that hold the fixed jaw plates have a double purpose here. The clamps 187, 187 are, as can be seen in FIG. 14, a split type clamp so that they will clamp down onto a cross rod 190 mounted in the clamps 187,187. At the end of the cross rod 190, that is adjacent the interface between two vises, a stop arm assembly 191 is mounted. The stop arm assembly 191 comprises a first mounting clamp 192 that is a split clamp that fits onto the cross rod 190. The upper end of the clamp 192 has a split clamp end as well, that includes an aperture that mounts a cylindrical stop arm 193. The stop arm 193 can be longitudinally adjusted and rotated in the opening on the clamp 192, and can then be clamped in place utilizing the split (bifurcated) ends of the clamp and a clamp screw 194. By tightening the clamp screw 194 the bifurcated opening leading to the aperture that mounts the arm 193 can be tightened down onto the arm. The arm 193 can be rotated about its axis to any desired position. A stop screw member 196 is threadably mounted at the end of the arm 193 adjacent the opening between the fixed jaw and the movable jaw, as can be seen in FIG. 14. This stop screw 196 is threaded in an opening that is adjacent a bifurcated end 197 of arm 193 that is capable of being clamped onto the screw 196 with a cap screw 198 to positively hold the screw 197 in adjusted position. The stop screw 196 has an axis that is perpendicular to the axis of the arm, and thus the screw 193 extends laterally from arm 193. The arm 193 can be rotated about its axis so that the screw 196 can be placed at an incline to project into the space between the vice jaws if desired.

The second stop assembly 186 is exactly the same as stop assembly 185, except that assembly 186 has a longer cross mounting rod indicated at 190A. The rod 190A has a stop arm assembly 191A positioned between the cap screws 188 that are holding clamps 187 and rod 190A in place. Thus the stop arm assembly 191A is in a position so that it overhangs the fixed jaw plate. A stop assembly 191B is also mounted at the outer end of the support rod 190A, and it can be seen that the rod 190A extends laterally beyond the side edge of the second vise more than the cross mounting rod 190. Thus, different lengths of cross rods can be utilized for different purposes.

As shown in FIG. 14, the supports 187 position the cross mounting rod upwardly near the upper edge of the jaw block 13. The clamp assemblies 191 are such that they raise the respective stop arms 193 up above the edge of the fixed jaw plate 14 for that vise. This means that the stop screw 196 can extend into the space between the fixed jaw 14 and the movable jaw (not shown) to provide a stop for piece parts that protrude from the guide surfaces 16 up as high as the screw 196. Also, as shown in FIG. 13, the stop arm 193 of stop arm assembly 191A can be rotated about its axis so that the axis of the screw 196 can be at an incline and extend to a location below the upper edge level of the jaw plate 14. If desired, the screw 196 can be elongated more to provide a stop for work pieces in the jaws.

It can be seen therefore that the positive stop assemblies are supported on cap screws 188 that are threaded into existing jaw plate attachment screw holes and which are below the level of the upper edge of the jaw plates. The stops have a cross rod mounted above these screws on brackets. A stop arm is mounted with respect to the cross rod on a clamp that raises the arm above the level of the jaw plates so that the stop arm can extend back toward the movable jaw and into the region or space where a work piece is clamped. As also shown in FIG. 14, when the stop assembly 191B and the arm 193 held thereon is at the outer edge of the jaw plate as shown for that stop clamp assembly, the stop clamp 192 for the stop assembly 191B can be rotated on the axis of the rod 190A so that the end of stop screw 196 is down below the level of the upper edge of the jaw plates and protrudes into the space between the two jaws of the vise on which the stop clamp 191 is mounted. The screw position forms a fixed, positive end stop for pieces to be held by the jaws.

What is claimed is:

1. A machine vise having a base assembly, guide rail means on said base assembly for guiding a movable jaw, a fixed jaw block at one end of the guide rail means, the fixed jaw block supporting a fixed jaw for mating with the movable jaw for clamping a work piece; a first screw member for moving the movable jaw, said screw member being operatively connected to move said movable jaw when the screw member is rotated, and a bore in said fixed jaw block, said bore being open from the outer end surface of the block and having an inner wall surface; and means reacting tension forces to the fixed jaw block through a reaction member on the first screw member when the first screw member is under tension, said means for reacting comprising a hydraulic actuator housing having a neck that fits into said bore and is retained therein, said hydraulic actuator housing including a piston in a bore of the housing operatively connected through a thrust bearing and a piston reaction member to the screw member on a side of said piston, such that introduction of hydraulic fluid under pressure into the actuator housing bore will cause the piston to exert tension on said screw member and react load caused by clamping the movable jaw relative to the fixed jaw into the fixed jaw block, the piston being operatively connected to the screw member by means of a connection which permits rotation of the screw member independently of said piston to permit threading said screw member for moving the movable jaw and manually loading the screw member in tension as the movable jaw is used for clamping.

2. The machine vise of claim 1 wherein said screw member has a portion which rotatably passes through the center of the piston to which it is connected and extends outwardly therefrom, the outwardly extending portion having a separate threaded portion, said reaction member further comprising a nut threaded on said separate threaded portion, said nut acting against said thrust bearing, and said thrust bearing in turn being supported against a side of said piston to permit rotation of said screw member relative to said piston to permit rotation of said screw member relative to said piston and thereby permit application of tension loads on the screw member through said piston and the nut.

3. The machine vise of claim 2 wherein said actuator has an outer housing connected to the neck, said neck having a bore through which said screw passes, and said neck being counterbored to a larger diameter than the screw to support a compression spring, and means on said screw to act against said compression spring to cause said compression spring to compress as the hydraulic actuator is operated to exert a tension load on said screw member.

4. The machine vise of claim 3 wherein the neck is retained in the bore by means of a set screw.

5. The machine vise of claim 1 wherein the bore in the fixed jaw block opens to a smaller diameter bore which closely fits an end portion of said screw member so that said screw member is rotatably supported in the bore portion of the fixed jaw block, the inner wall surface forming a shoulder around said bore portion that rotatably supports the screw.

6. A replacement kit for a vise that has a first screw for actuating a movable jaw, and a fixed jaw cooperating with said movable jaw, said fixed jaw being mounted on a fixed jaw block at one end of said vise, a bore in said fixed jaw block, said bore having an end wall forming a reaction shoulder facing outwardly toward the outer end of the bore, an opening through the end wall, said first screw extending through said opening and passing into said bore, and means between said first screw and said reaction surface to react tension loads in said first screw into the fixed jaw block through the reaction shoulder and the end wall as the first screw rotates to place a tension force on the first screw as the movable jaw is tightened, said kit comprising a replacement screw for an originally provided first screw that passes through said opening and couples to the movable jaw, and a hydraulic actuator having a housing with a neck that fits within said bore and has an end that abuts the reaction shoulder, means for retaining said neck in said bore, said hydraulic actuator being concentric with the axis of rotation of the replacement screw and having a piston operatively connected to said replacement screw to exert a tension force on said replacement screw as the movable jaw is tightened.

7. A convertible vise for converting from a screw operated movable jaw to a hydraulic actuator movable jaw without changing the reaction members on the vise, comprising a vise having a base assembly, guide rail means on said base assembly for guiding a movable jaw, a fixed jaw block at one end of the guide rail means, the fixed jaw block supporting a fixed jaw for mating with the movable jaw for clamping a workpiece; a first screw member for moving the movable jaw when the screw member is rotated; a bore in said fixed jaw block, said bore being opened from the outer end surface of the block and having an inner wall surface; reaction means attached to said first screw member and fitting in said bore; said reaction means reacting forces on the first screw member when the first screw member is placed under tension as it is threaded to move the movable jaw toward the fixed jaw and apply a load to a workpiece; said first screw member being removable from the base assembly; including the improvement comprising a replacement kit for hydraulic actuation of the movable jaw after the first screw member is removed, including a second screw member that is operatively connectable to the movable jaw and which passes through the bore member; a hydraulic actuator assembly having a hub that fits within the bore, and an actuator housing on the exterior of the fixed jaw block and of larger size than the bore; a piston slidable within said actuator housing; said second screw member having a portion passing through the hub and through the piston, and the second screw member having reaction means on a side of said piston opposite from the fixed jaw block acting with said piston to permit the piston to be actuated to place tension in the second screw member under hydraulic pressure to clamp the movable jaw against a workpiece held between the fixed jaw and movable jaw.

* * * * *